(12) United States Patent
Cao et al.

(10) Patent No.: US 11,339,493 B2
(45) Date of Patent: May 24, 2022

(54) SYSTEMS AND METHODS OF CONTROLLING ELECTROPLATING

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/176,660

(22) Filed: Feb. 16, 2021

(65) Prior Publication Data

US 2021/0164121 A1 Jun. 3, 2021

Related U.S. Application Data (63) Continuation of application No. PCT/CN2018/104597, filed on Sep. 7, 2018.

(51) Int. Cl.
*G01N 23/223* (2006.01)
*C25D 5/00* (2006.01)

(52) U.S. Cl.
CPC ............ *C25D 5/013* (2020.08); *G01N 23/223* (2013.01); *G01N 2223/076* (2013.01)

(58) Field of Classification Search
CPC ............ G01N 2223/076; G01N 23/06; G01N 30/00; G01N 33/2858; G01N 35/1095; G01N 1/20; G01N 21/64; G01N 2223/652; G01N 33/0013; G01N 33/582; G01N 2015/1486; G01N 2223/04; G01N 23/12; G01N 23/083; G01N 2223/635; G01N 23/22; G01N 2223/1016; G01T 1/36

See application file for complete search history.

(56) References Cited

U.S. PATENT DOCUMENTS

| 4,317,035 A | 2/1982 | Cohen et al. |
| 2006/0072701 A1* | 4/2006 | van Kessel ............ G01N 23/06 378/47 |
| 2018/0081071 A1 | 3/2018 | Cao et al. |

FOREIGN PATENT DOCUMENTS

| CN | 1331798 A | 1/2002 |
| CN | 103699143 A | 4/2014 |
| CN | 104884946 A | 9/2015 |
| CN | 105203573 A | 12/2015 |
| CN | 108271415 A | 7/2018 |

\* cited by examiner

*Primary Examiner* — Don K Wong
(74) *Attorney, Agent, or Firm* — IPro, PLLC; Qian Gu (57) ABSTRACT

Disclosed herein is a system, comprising: a detector configured to determine a number of photons of one or more characteristic X-rays emitted by a chemical element in the electrolyte and received by the detector, within a period of time; a processor configured to determine a concentration of the chemical element in the electrolyte based on the number; a controller configured to replenish the chemical element into the electrolyte or configured to stop electroplating with the electrolyte, based on the concentration.

22 Claims, 12 Drawing Sheets

SYSTEMS AND METHODS OF CONTROLLING ELECTROPLATING

BACKGROUND

Figure 1A:
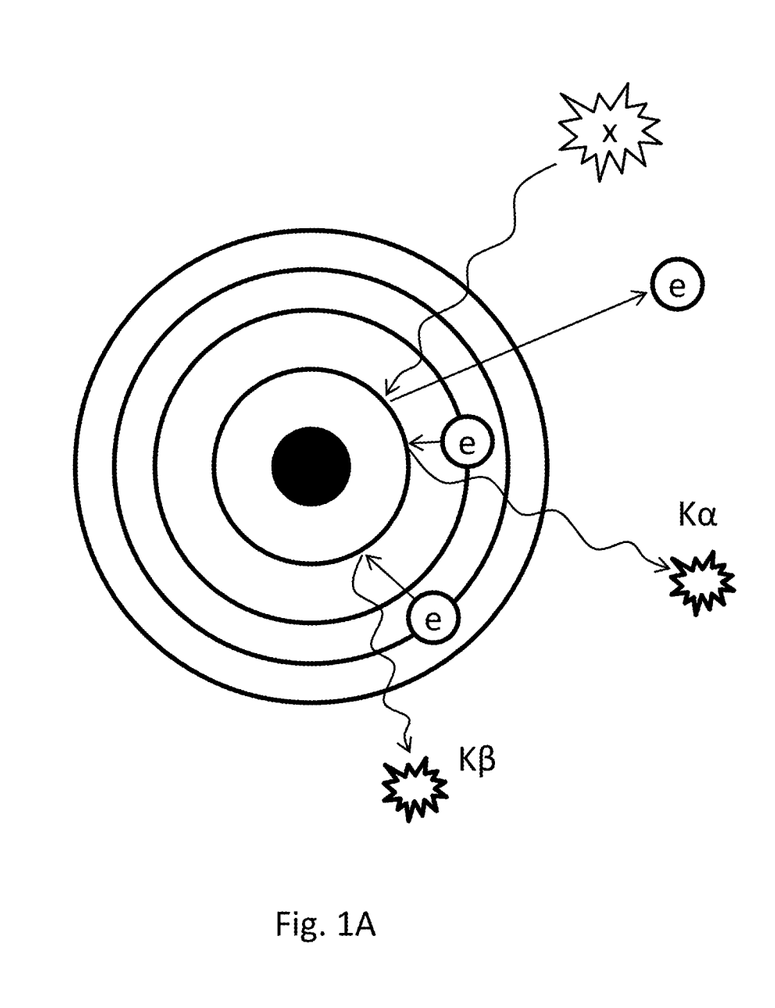
FIG. 1A and FIG. 1B schematically explains the origin of characteristic X-rays of a chemical element.
Figure 1B:
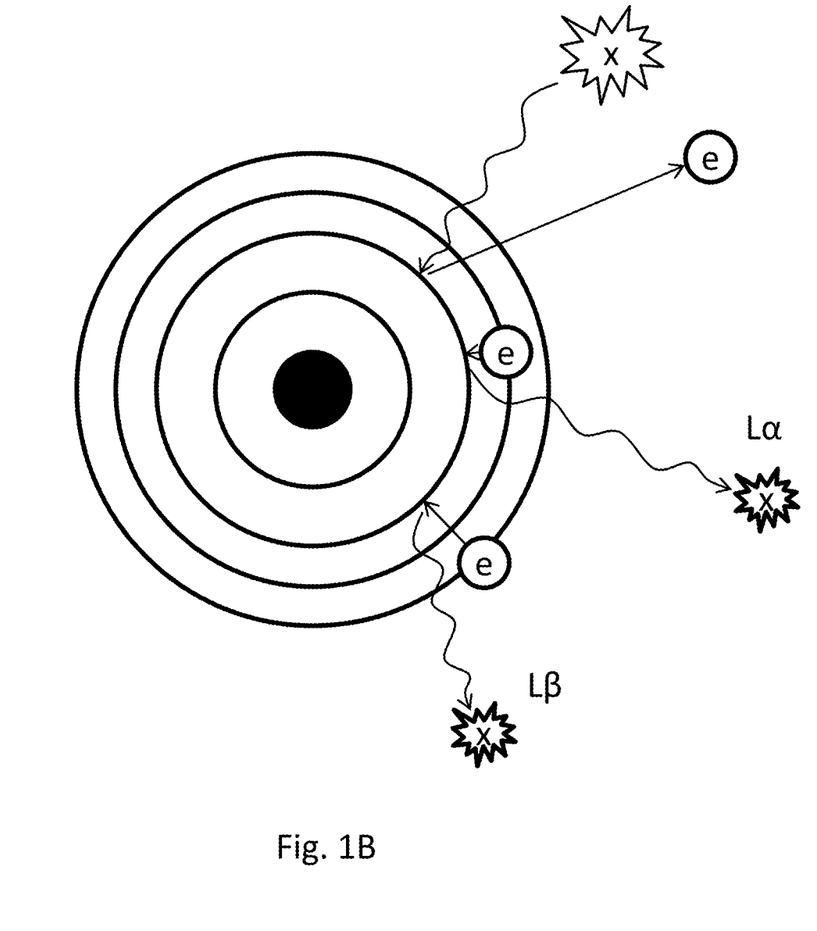

X-ray fluorescence (XRF) is the emission of characteristic X-rays from a material that has been excited by, for example, radiation such as high-energy X-rays or gamma rays. By analyzing the fluorescent X-ray spectrum of a sample, the elements in the sample can be identified because each element has distinct characteristic X-rays. As shown in FIG. 1A, when an electron on the L orbital relaxes to fill a vacancy on the K orbital (L→K), the characteristic X-ray is called Kα. The characteristic X-ray from M→K relaxation is called Kβ. As shown in FIG. 1B, the characteristic X-ray from M→L relaxation is called Lα, and so on. The presence and intensities of the characteristic X-rays of an element can be used to determine the amount of that element in the sample.

SUMMARY

Disclosed herein is a system, comprising: a detector configured to determine a number of photons of one or more characteristic X-rays emitted by a chemical element in an electrolyte and received by the detector, within a period of time; a processor configured to determine a concentration of the chemical element in the electrolyte based on the number; a controller configured to replenish the chemical element into the electrolyte or configured to stop electroplating with the electrolyte, based on the concentration.

According to an embodiment, the controller is configured to replenish the chemical element into the electrolyte or configured to stop electroplating with the electrolyte, when the concentration falls below a threshold.

According to an embodiment, the detector is configured to exclude photons whose energies are below a cutoff energy from the number.

According to an embodiment, the controller is configured to stop electroplating by stopping applying an electric current through the electrolyte.

According to an embodiment, the controller is configured to stop electroplating by removing a workpiece from the electrolyte.

According to an embodiment, the cutoff energy is 2 keV.

According to an embodiment, the detector is configured to determine the number based on charge carriers generated in the detector by the photons.

According to an embodiment, the system further comprises a radiation source configured to direct radiation toward the electrolyte; wherein the radiation causes emission of the one or more characteristic X-rays of the chemical element.

According to an embodiment, the detector further comprises a plurality of pixels.

According to an embodiment, the detector further comprises: an X-ray absorption layer comprising an electric contact; a first voltage comparator configured to compare a voltage of the electric contact to a first threshold; a second voltage comparator configured to compare the voltage to a second threshold; a detector controller; a plurality of counters each associated with a bin and configured to register a number of X-ray photons absorbed by the X-ray absorption layer and whose energy is in that bin; wherein the detector controller is configured to start a time delay from a time at which the first voltage comparator determines that an absolute value of the voltage equals or exceeds an absolute value of the first threshold; wherein the detector controller is configured to determine whether an energy of an X-ray photon falls into the bin; wherein the detector controller is configured to cause the number registered by the counter associated with the bin to increase by one.

According to an embodiment, the detector further comprises an integrator electrically connected to the electric contact, wherein the integrator is configured to collect charge carriers from the electric contact.

According to an embodiment, the detector controller is configured to activate the second voltage comparator at a beginning or expiration of the time delay.

According to an embodiment, the detector controller is configured to connect the electric contact to an electrical ground.

According to an embodiment, the X-ray absorption layer comprises silicon, germanium, GaAs, CdTe, CdZnTe, or a combination thereof.

According to an embodiment, the detector does not comprise a scintillator.

Disclosed herein is a method comprising: determining a number of photons of one or more characteristic X-rays emitted by a chemical element in an electrolyte, within a period of time, while a workpiece is electroplated in the electrolyte; determining a concentration of the chemical element in the electrolyte based on the number; replenishing the chemical element in the electrolyte or stopping electroplating the workpiece in the electrolyte, based on the concentration.

According to an embodiment, the chemical element is replenished or electroplating the workpiece is stopped when the concentration falls below a threshold.

According to an embodiment, the method further comprises illuminating the electrolyte with radiation.

According to an embodiment, photons whose energies are below a cutoff energy are excluded from the number.

According to an embodiment, stopping the electroplating is by stopping applying an electric current through the electrolyte.

According to an embodiment, stopping the electroplating is by removing the workpiece from the electrolyte.

According to an embodiment, the cutoff energy is 2 keV.

DETAILED DESCRIPTION

Figure 2:
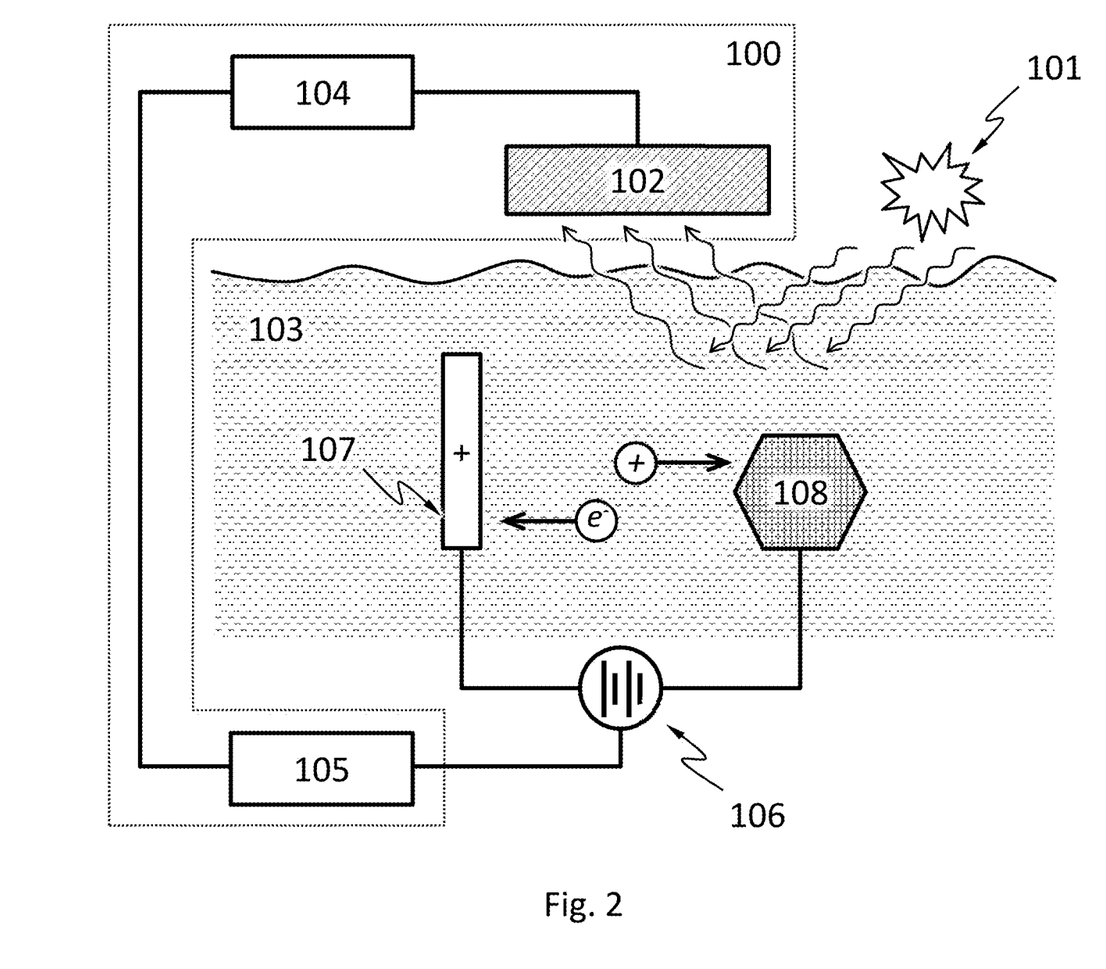
FIG. 2 schematically shows a system, according to an embodiment.

FIG. 2 schematically shows a system 100, according to an embodiment. The system 100 may be used to control electroplating. In electroplating, a workpiece 108 and an anode 107 are immersed in an electrolyte 103. The electrolyte 103 has ions that include a chemical element to be electroplated onto the workpiece 108. A power supply 106 applies an electric current through the electrolyte 103 between the anode 107 and the workpiece 108, which serves as a cathode. Under the effect of the electric current, the ions in the electrolyte 103 are attracted to the workpiece 108, and the ions are reduced and deposited onto the workpiece 108. The anode 107 may be an inert material (i.e., a material that only exchanges electrons with the electrolyte 103, such as a gold, platinum, graphite). The anode 107 may include the chemical element to be electroplated onto the workpiece 108, where the chemical element may dissolve into and replenish the ions in the electrolyte 103.

The system 100 has a detector 102. The detector 102 can count the number of photons of characteristic X-rays emitted by the chemical element in the electrolyte 103 and received by the detector 102 within a period of time. Emission of the characteristic X-rays may be due to excitation of the chemical element by a radiation directed toward the electrolyte 103. Examples of the radiation may include X-rays and gamma rays. The system 100 may include a radiation source 101 that produces the radiation and directs it toward the electrolyte 103. The detector 102 may exclude photons whose energies are below a cutoff energy (e.g., 2 keV) from the number of photons it counts. The system 100 has a processor 104. The processor 104 can determine the concentration of the chemical element in the electrolyte 103 based on the number the detector 102 counted. Generally, the higher the number is, the higher the concentration is. The system 100 has a controller 105. The controller 105 can replenish the chemical element into the electrolyte 103 or stop electroplating with the electrolyte 103 based on the concentration the processor 104 determined. For example, if the concentration falls below a threshold, the controller 105 may add the chemical element or a compound with it into the electrolyte 103. For example, if the concentration falls below the threshold, the controller 105 may stop electroplating by stopping applying the electric current through the electrolyte 103 (e.g., by turning off the power supply 106), or by removing the workpiece 108 from the electrolyte 103.

Figure 3A:
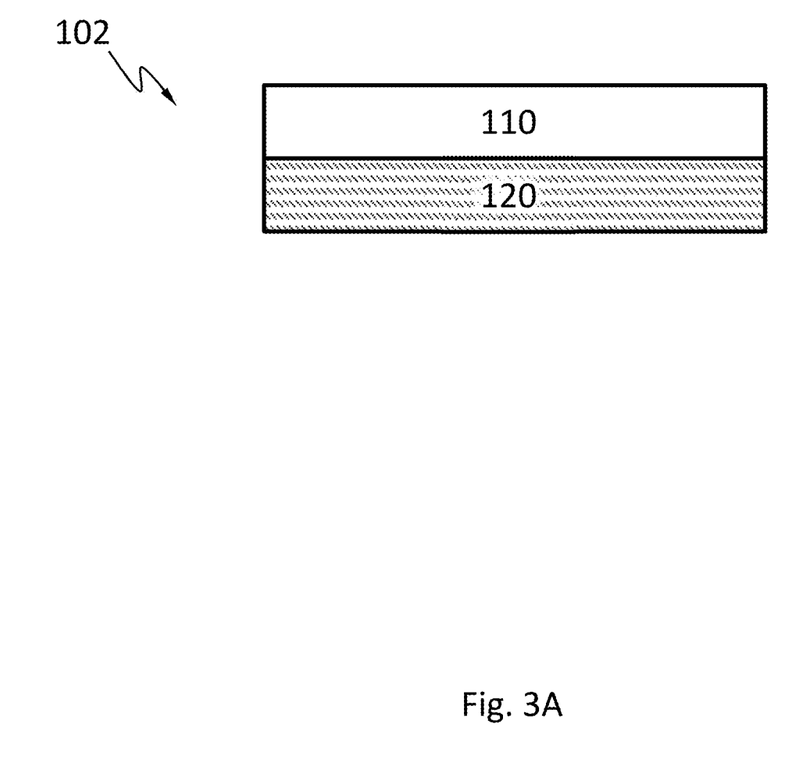
FIG. 3A, FIG. 3B and FIG. 3C schematically show a detector of the system, according to an embodiment.

As schematically shown in FIG. 3A, the detector 102 may include an X-ray absorption layer 110 and an electronics layer 120 (e.g., an ASIC) for processing or analyzing electrical signals incident X-ray generates in the X-ray absorption layer 110. The X-ray absorption layer 110 may include a semiconductor material such as, silicon, germanium, GaAs, CdTe, CdZnTe, or a combination thereof. The semiconductor may have a high mass attenuation coefficient for the characteristic X-rays. In an embodiment, the detector does not comprise a scintillator.

Figure 3B:
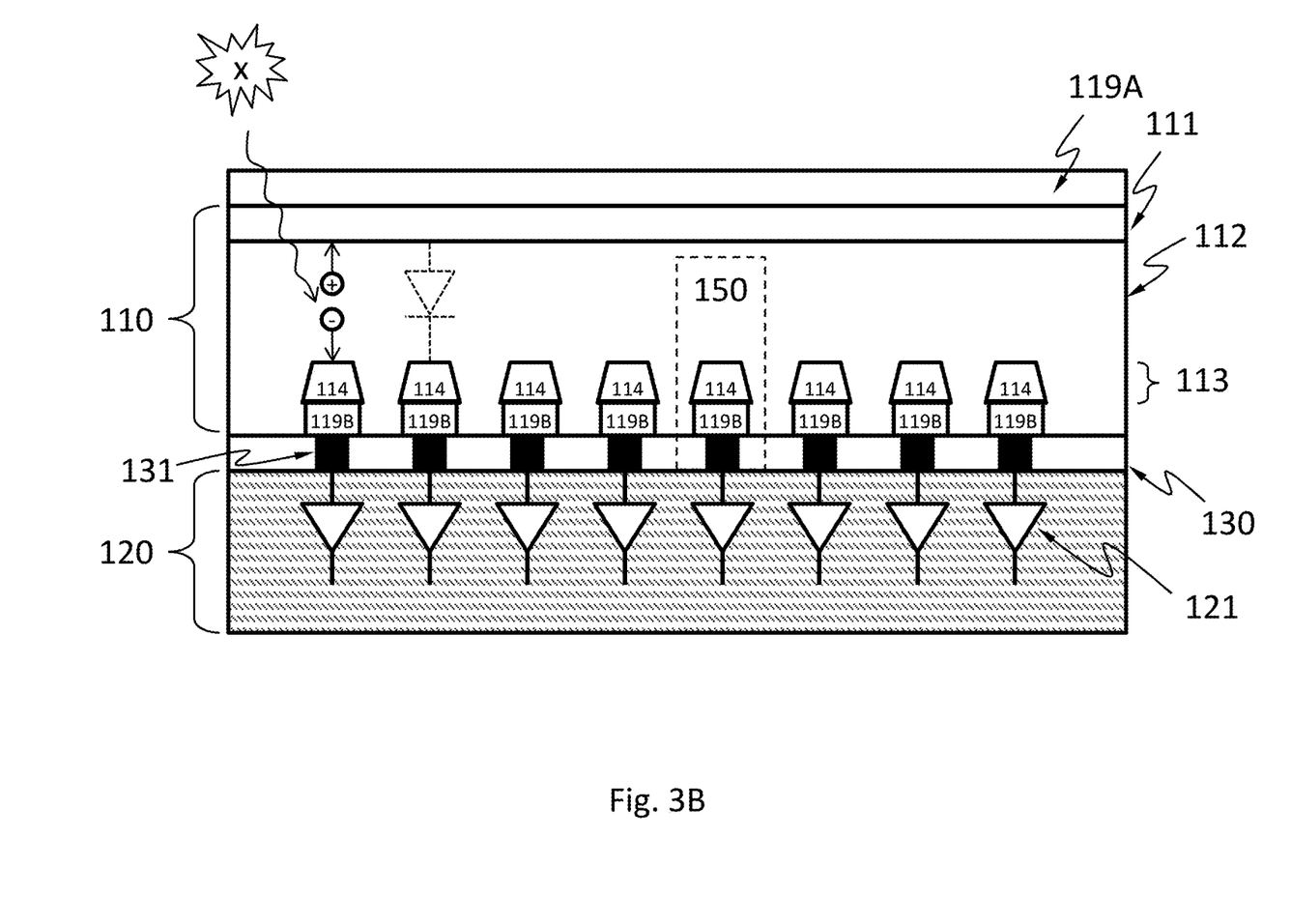

As shown in a detailed cross-sectional view of the detector 102 in FIG. 3B, according to an embodiment, the X-ray absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114, if present, are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 3B, each of the discrete regions 114 of the second doped region 113 forms a diode with the first doped region 111 and the optional intrinsic region 112. Namely, in the example in FIG. 3B, the X-ray absorption layer 110 has a plurality of diodes having the first doped region 111 as a shared electrode. The first doped region 111 may also have discrete portions. The X-ray absorption layer 110 may include only one diode.

When an X-ray photon hits the X-ray absorption layer 110 including one or more diodes, the X-ray photon may be absorbed and generate charge carriers by a number of mechanisms. An X-ray photon may generate 10 to 100000 charge carriers. The charge carriers may drift to the electrodes of one of the diodes under an electric field. The field may be an external electric field. The electric contact 119B may include discrete portions each of which is in electric contact with the discrete regions 114.

Figure 3C:
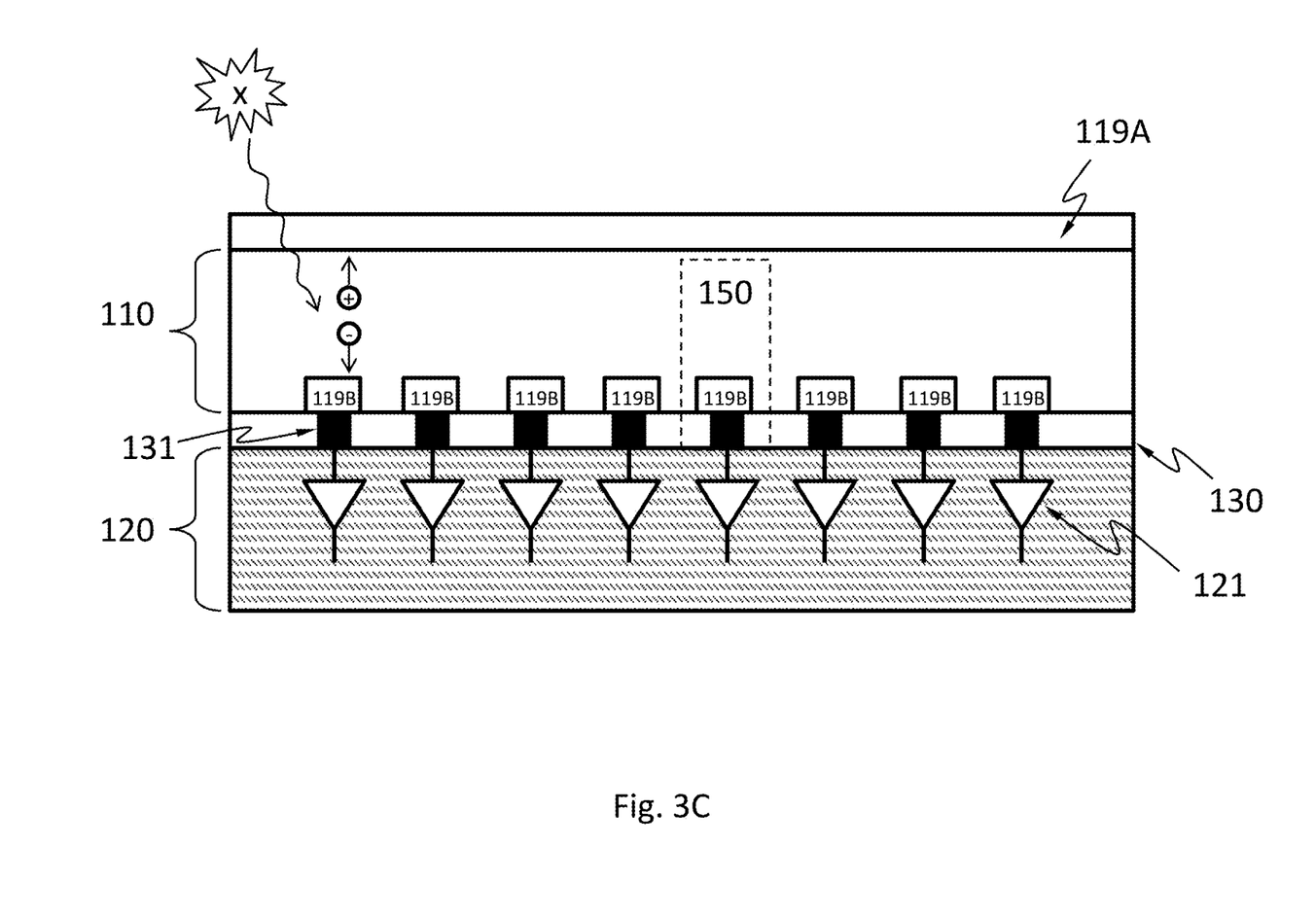

As shown in an alternative detailed cross-sectional view of the detector 102 in FIG. 3C, according to an embodiment, the X-ray absorption layer 110 may include a resistor of a semiconductor material such as, silicon, germanium, GaAs, CdTe, CdZnTe, or a combination thereof, but does not include a diode. The semiconductor may have a high mass attenuation coefficient for the characteristic X-rays.

When an X-ray photon hits the X-ray absorption layer 110 including a resistor but not diodes, it may be absorbed and generate one or more charge carriers by a number of mechanisms. An X-ray photon may generate 10 to 100000 charge carriers. The charge carriers may drift to the electric contacts 119A and 119B under an electric field. The field may be an external electric field. The electric contact 119B includes discrete portions.

The electronics layer 120 may include an electronic system 121, suitable for processing or interpreting signals generated by X-ray photons incident on the X-ray absorption layer 110. The electronic system 121 may include an analog circuitry such as a filter network, amplifiers, integrators, and comparators, or a digital circuitry such as a microprocessor, and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the X-ray absorption layer 110. Other bonding techniques are possible to connect the electronic system 121 to the pixels without using vias.

Figure 4A:
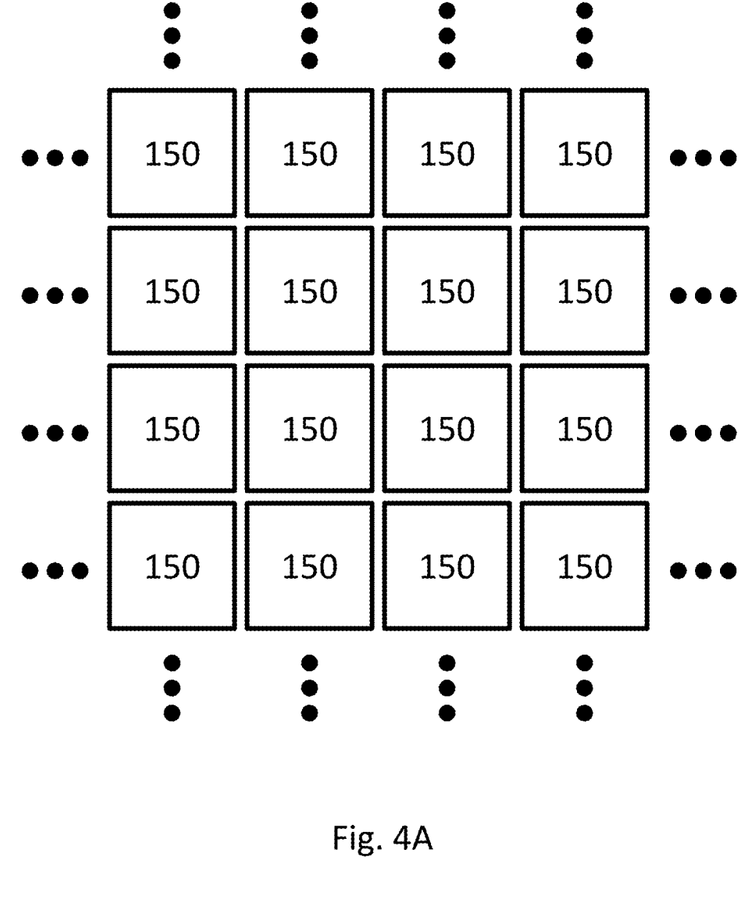
FIG. 4A shows that the detector may have multiple pixels.

As schematically shown in FIG. 4A, the detector 102 may have an array of pixels 150. The array may be a rectangular array, a honeycomb array, a hexagonal array or any other suitable array. Each pixel 150 is configured to detect an X-ray photon incident thereon and measure the energy of the X-ray photon. For example, each pixel 150 is configured to count numbers of X-ray photons incident thereon whose energy falls in a plurality of bins, within a period of time. All the pixels 150 may be configured to count the numbers of X-ray photons incident thereon within a plurality of bins of energy within the same period of time. Each pixel 150 may have its own analog-to-digital converter (ADC) configured to digitize an analog signal representing the energy of an incident X-ray photon into a digital signal. An ADC with a 10-bit resolution or higher is useful. Each pixel 150 may be configured to measure its dark current, such as before or concurrently with each X-ray photon incident thereon. Each pixel 150 may be configured to deduct the contribution of the dark current from the energy of the X-ray photon incident thereon. The pixels 150 may be configured to operate in parallel. For example, when one pixel 150 measures an incident X-ray photon, another pixel 150 may be waiting for an X-ray photon to arrive. The pixels 150 may not have to be individually addressable.

The detector 102 may have 1, at least 10, at least 100, or more pixels 150. The detector 102 may be configured to add the numbers of X-ray photons for the bins of the same energy range counted by all the pixels 150. For example, the detector 102 may add the numbers the pixels 150 stored in a bin for energy from 70 keV to 71 keV, add the numbers the pixels 150 stored in a bin for energy from 71 keV to 72 keV, and so on. The detector 102 may compile the added numbers for the bins as a spectrum of the X-ray photons incident on the detector 102.

Figure 4B:
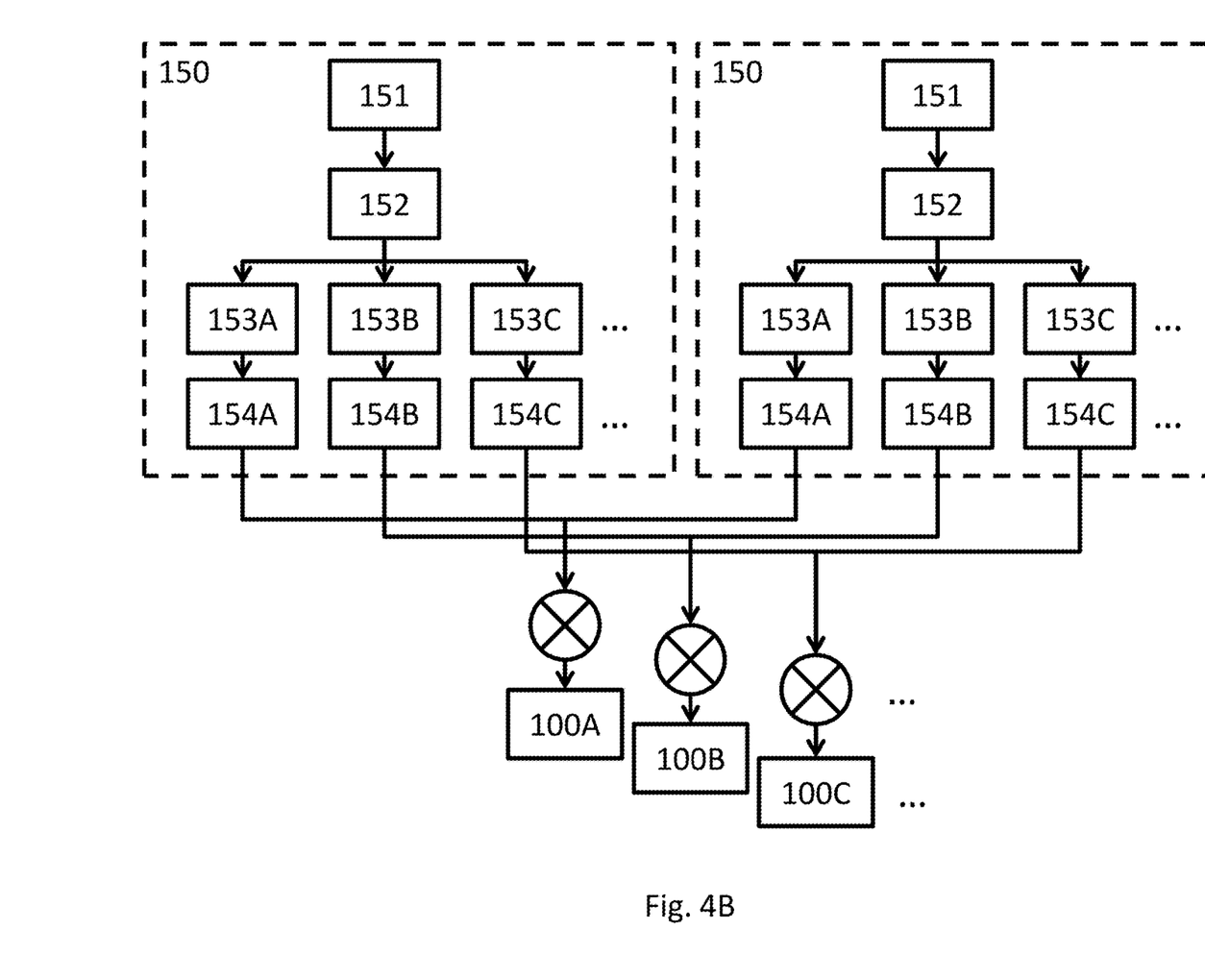
FIG. 4B schematically shows a block diagram for the detector, according to an embodiment.

FIG. 4B schematically shows a block diagram for the detector 102, according to an embodiment. Each pixel 150 may measure the energy 151 of an X-ray photon incident thereon. The energy 151 of the X-ray photon is digitized (e.g., by an ADC) in step 152 into one of a plurality of bins 153A, 153B, 153C . . . . The bins 153A, 153B, 153C . . . each have a corresponding counter 154A, 154B and 154C, respectively. When the energy 151 is allocated into a bin, the number stored in the corresponding counter increases by one. The detector 102 may added the numbers stored in all the counters corresponding to bins for the same energy range in the pixels 150. For example, the numbers stored in all the counters 154C in all pixels 150 may be added and stored in a global counter 100C for the same energy range. The numbers stored in all the global counters may be compiled into an energy spectrum of the X-ray incident on the detector 102.

Figure 5A:
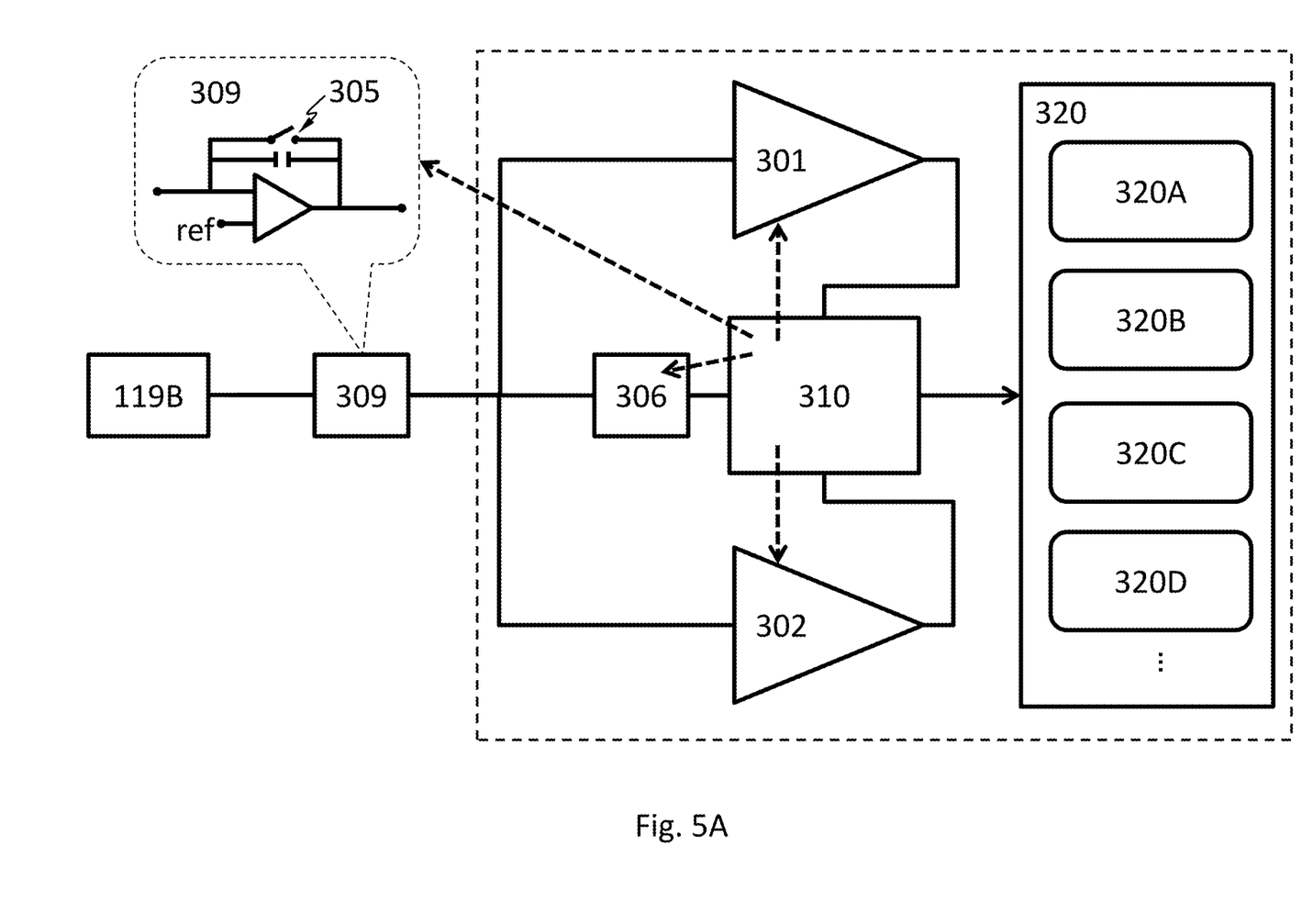
FIG. 5A and FIG. 5B each show a component diagram of the electronic system of the detector, according to an embodiment.
Figure 5B:
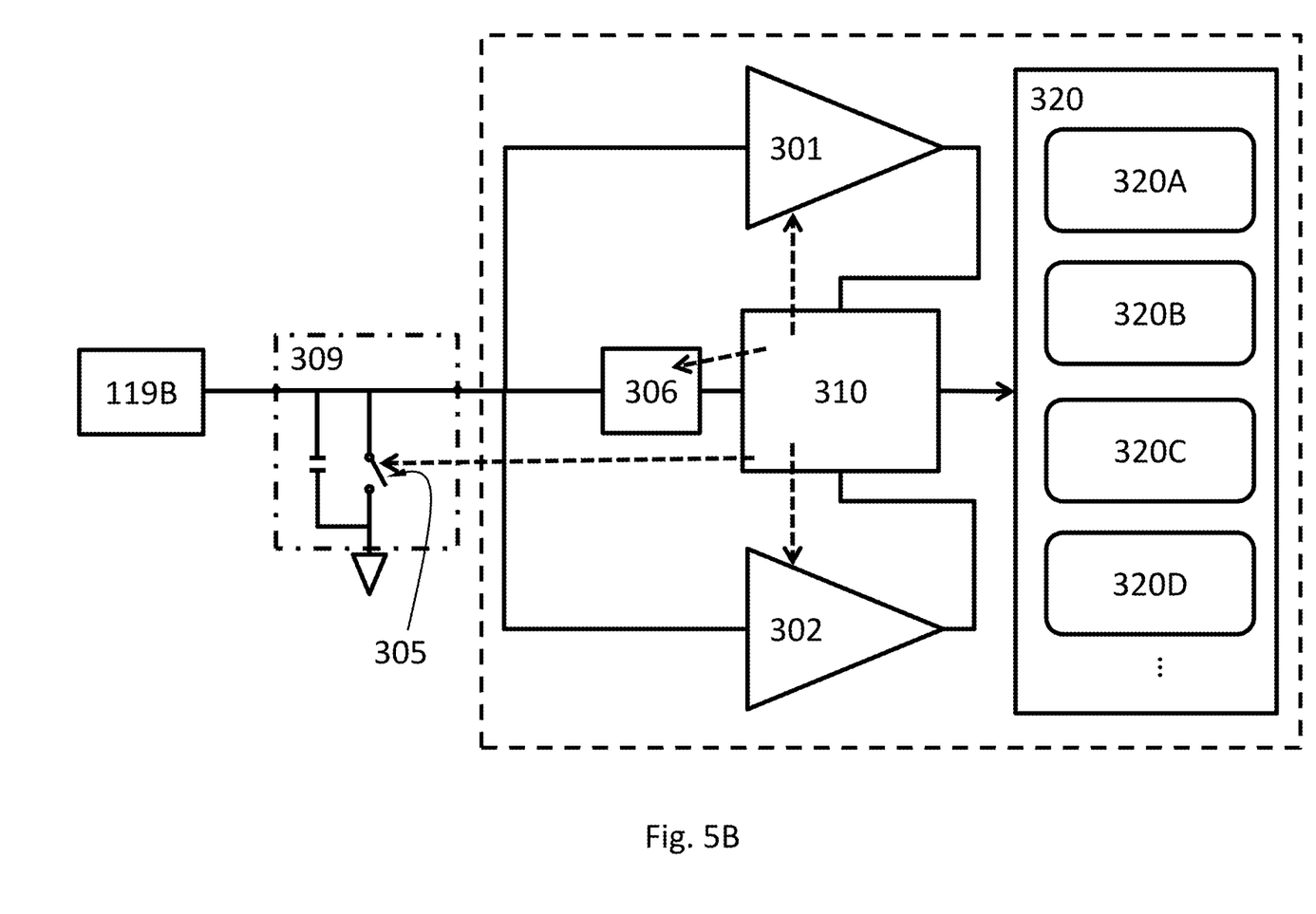

FIG. 5A and FIG. 5B each show a component diagram of the electronic system 121, according to an embodiment. The electronic system 121 may include a first voltage comparator 301, a second voltage comparator 302, a plurality of counters 320 (including counters 320A, 320B, 320C, 320D . . . ), a switch 305, an ADC 306 and a detector controller 310.

The first voltage comparator 301 is configured to compare the voltage of the electric contact 119B (or a discrete portion thereof) to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the detector controller 310. The first threshold may be 1-5%, 5-10%, 10%-20%, 20-30%, 30-40% or 40-50% of the maximum voltage one incident X-ray photon may generate on the electric contact 119B (or a discrete portion thereof). The maximum voltage may depend on the energy of the incident X-ray photon (i.e., the wavelength of the incident X-ray), the material of the X-ray absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activate or deactivated by the detector controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, \text{ if } x \geq 0 \\ -x, \text{ if } x \leq 0 \end{cases}.$$

In this example, the second threshold may be the voltage one incident X-ray photon with 2 KeV energy may generate on the electric contact 119B (or a discrete portion thereof). For example, the second threshold may be 100 mV, 150 mV, 200 mV, 250 mV or 300 mV. The second voltage comparator 302 and the first voltage comparator 301 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident X-ray. However, having a high speed is often at the cost of power consumption.

The counters 320 may be a software component (e.g., numbers stored in a computer memory) or a hardware component (e.g., 4017 IC and 7490 IC). Each counter 320 is associated with a bin for an energy range. For example, counter 320A may be associated with a bin for 70-71 keV, counter 320B may be associated with a bin for 71-72 keV, counter 320C may be associated with a bin for 72-73 keV, counter 320D may be associated with a bin for 73-74 keV. When the energy of an incident X-ray photons is determined by the ADC 306 to be in the bin a counter 320 is associated with, the number registered in the counter 320 is increased by one.

The detector controller 310 may be a hardware component such as a microcontroller and a microprocessor. The detector controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The detector controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire after the voltage becomes stable, i.e., the rate of change of the voltage is substantially zero. The phase "the rate of change is substantially zero" means that temporal change is less than 0.1%/ns. The phase "the rate of change is substantially non-zero" means that temporal change of the voltage is at least 0.1%/ns.

The detector controller 310 may be configured to activate the second voltage comparator during (including the beginning and the expiration) the time delay. In an embodiment, the detector controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The detector controller 310 itself may be deactivated until the output of the first voltage comparator 301 activates the detector controller 310 when the absolute value of the voltage equals or exceeds the absolute value of the first threshold.

The detector controller 310 may be configured to cause the number registered by one of the counters 320 to increase by one, if, during the time delay, the second voltage comparator 302 determines that the absolute value of the voltage equals or exceeds the absolute value of the second threshold, and the energy of the X-ray photon falls in the bin associated with the counter 320.

The detector controller 310 may be configured to cause the ADC 306 to digitize the voltage upon expiration of the time delay and determine based on the voltage which bin the energy of the X-ray photon falls in.

The detector controller 310 may be configured to connect the electric contact 119B (or a discrete portion thereof) to an electrical ground, so as to reset the voltage and discharge any charge carriers accumulated on the electric contact 119B (or a discrete portion thereof). In an embodiment, the electric contact 119B (or a discrete portion thereof) is connected to an electrical ground after the expiration of the time delay. In an embodiment, the electric contact 119B (or a discrete portion thereof) is connected to an electrical ground for a finite reset time period. The detector controller 310 may connect the electric contact 119B (or a discrete portion thereof) to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The ADC 306 may feed the voltage it measures to the detector controller 310 as an analog or digital signal. The ADC may be a successive-approximation-register (SAR) ADC (also called successive approximation ADC). An SAR ADC digitizes an analog signal via a binary search through all possible quantization levels before finally converging upon a digital output for the analog signal. An SAR ADC may have four main subcircuits: a sample and hold circuit to acquire the input voltage ($V_{in}$), an internal digital-analog converter (DAC) configured to supply an analog voltage comparator with an analog voltage equal to the digital code output of the successive approximation register (SAR), the analog voltage comparator that compares $V_{in}$ to the output of the internal DAC and outputs the result of the comparison to the SAR, the SAR configured to supply an approximate digital code of $V_{in}$ to the internal DAC. The SAR may be initialized so that the most significant bit (MSB) is equal to a digital 1. This code is fed into the internal DAC, which then supplies the analog equivalent of this digital code ($V_{ref}/2$) into the comparator for comparison with $V_{in}$. If this analog voltage exceeds $V_{in}$ the comparator causes the SAR to reset this bit; otherwise, the bit is left a 1. Then the next bit of the SAR is set to 1 and the same test is done, continuing this binary search until every bit in the SAR has been tested. The resulting code is the digital approximation of $V_{in}$ and is finally output by the SAR at the end of the digitization.

Figure 6:
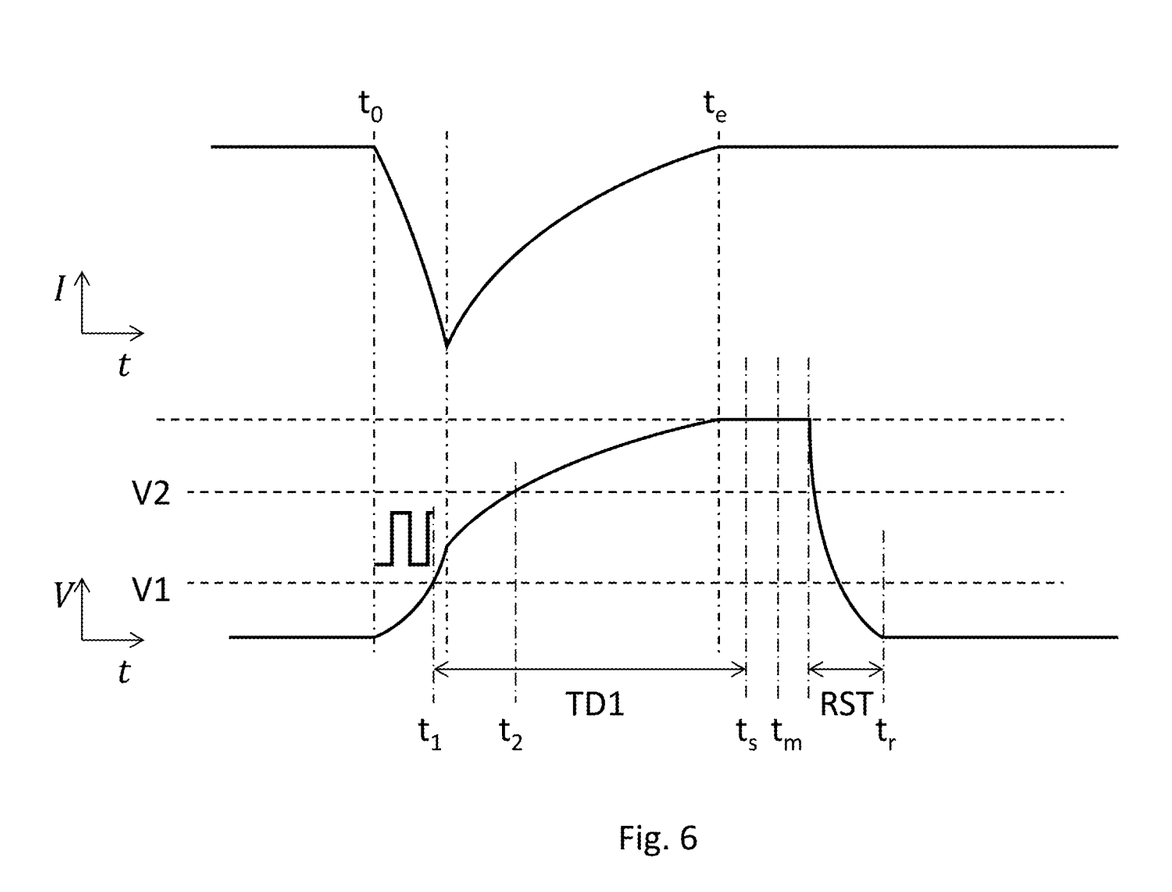
FIG. 6 schematically shows a temporal change of the electric current flowing through an electric contact (upper curve) caused by charge carriers generated by an X-ray photon incident on a pixel associated with the electric contact, and a corresponding temporal change of the voltage of the electric contact (lower curve).

The system 121 may include an integrator 309 electrically connected to the electric contact 119B (or a discrete portion thereof), wherein the integrator is configured to collect charge carriers from the electric contact 119B (or a discrete portion thereof). The integrator can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 6, between $t_s$ to $t_0$). After the integration period has expired, the capacitor voltage is sampled by the ADC 306 and then reset by a reset switch. The integrator 309 can include a capacitor directly connected to the electric contact 119B (or a discrete portion thereof).

FIG. 6 schematically shows, in the upper curve, a temporal change of the electric current flowing through the electric contact 119B (or a discrete portion thereof) caused by charge carriers generated by an X-ray photon incident on the pixel 150 associated with the electric contact 119B (or a discrete portion thereof), and in the lower curve, a corresponding temporal change of the voltage of the electric contact 119B (or a discrete portion thereof). The voltage may be an integral of the electric current with respect to time. At time $t_0$, the X-ray photon hits the diode or the resistor, charge carriers start being generated in the pixel 150, electric current starts to flow through the electric contact 119B (or a discrete portion thereof), and the absolute value of the voltage of the electric contact 119B (or a discrete portion thereof) starts to increase. At time $t_1$, the first voltage comparator 301 determines that the absolute value of the voltage equals or exceeds the absolute value of the first threshold V1, and the detector controller 310 starts the time delay TD1 and the detector controller 310 may deactivate the first voltage comparator 301 at the beginning of TD1. If the detector controller 310 is deactivated before $t_1$, the detector controller 310 is activated at $t_1$. During TD1, the detector controller 310 activates the second voltage comparator 302. The term "during" a time delay as used here means the beginning and the expiration (i.e., the end) and any time in between. For example, the detector controller 310 may activate the second voltage comparator 302 at the expiration of TD1. If during TD1, the second voltage comparator 302 determines that the absolute value of the voltage equals or exceeds the absolute value of the second threshold V2 at time $t_2$, the detector controller 310 waits for stabilization of the voltage to stabilize. The voltage stabilizes at time $t_e$, when all charge carriers generated by the X-ray photon drift out of the X-ray absorption layer 110. At time $t_s$, the time delay TD1 expires. At or after time $t_e$, the detector controller 310 causes the ADC 306 to digitize the voltage and determines which bin the energy of the X-ray photons falls in. The detector controller 310 then causes the number registered by the counter 320 corresponding to the bin to increase by one. In the example of FIG. 6, time $t_s$ is after time $t_e$; namely TD1 expires after all charge carriers generated by the X-ray photon drift out of the X-ray absorption layer 110. If time $t_e$ cannot be easily measured, TD1 can be empirically chosen to allow sufficient time to collect essentially all charge carriers generated by an X-ray photon but not too long to risk have another incident X-ray photon. Namely, TD1 can be empirically chosen so that time $t_s$ is empirically after time $t_e$. Time $t_s$ is not necessarily after time $t_e$ because the detector controller 310 may disregard TD1 once V2 is reached and wait for time $t_e$. The rate of change of the difference between the voltage and the contribution to the voltage by the dark current is thus substantially zero at $t_e$. The detector controller 310 may be configured to deactivate the second voltage comparator 302 at expiration of TD1 or at $t_2$, or any time in between.

The voltage at time $t_e$ is proportional to the amount of charge carriers generated by the X-ray photon, which relates to the energy of the X-ray photon. The detector controller 310 may be configured to determine the bin the energy of the X-ray photon falls in, based on the output of the ADC 306.

After TD1 expires or digitization by the ADC 306, whichever later, the detector controller 310 connects the electric contact 119B (or a discrete portion thereof) to an electric ground for a reset period RST to allow charge carriers accumulated on the electric contact 119B (or a discrete portion thereof) to flow to the ground and reset the voltage. After RST, the system 121 is ready to detect another incident X-ray photon. Implicitly, the rate of incident X-ray photons the system 121 can handle in the example of FIG. 6 is limited by 1/(TD1+RST). If the first voltage comparator 301 has been deactivated, the detector controller 310 can activate it at any time before RST expires. If the detector controller 310 has been deactivated, it may be activated before RST expires.

Because the detector 102 has many pixels 150 that may operate in parallel, the detector can handle much higher rate of incident X-ray photons. This is because the rate of incidence on a particular pixel 150 is 1/N of the rate of incidence on the entire array of pixels, where N is the number of pixels.

Figure 7:
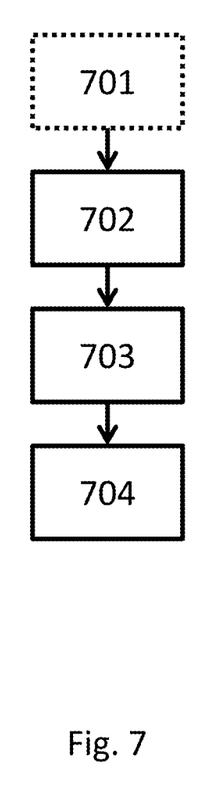
FIG. 7 schematically shows a flowchart for a method, according to an embodiment.

FIG. 7 shows a flowchart for a method, according to an embodiment. In optional procedure 701, the electrolyte is illuminated with radiation (e.g., X-rays or gamma rays from the radiation source 101). In procedure 702, a number of photons of characteristic X-rays emitted from the chemical element in the electrolyte 103 within a period of time is determined (e.g., using the detector 102). Emission of the characteristic X-rays may be caused by the radiation. Photons whose energies are below a cutoff energy (e.g., 2 keV) may be excluded from the number. In procedure 703, the concentration of the chemical element in the electrolyte 103 is determined (e.g., using the processor 104) based on the number. In procedure 704, the chemical element in the electrolyte 103 is replenished or electroplating the workpiece 108 in the electrolyte is stopped, based on the concentration (e.g., when the concentration falls below a threshold).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a detector configured to determine a number of photons of one or more characteristic X-rays emitted by a chemical element in an electrolyte and received by the detector, within a period of time;
    a processor configured to determine a concentration of the chemical element in the electrolyte based on the number;
    a controller configured to replenish the chemical element into the electrolyte or configured to stop electroplating with the electrolyte, based on the concentration.

2. The system of claim 1, wherein the controller is configured to replenish the chemical element into the electrolyte or configured to stop electroplating with the electrolyte, when the concentration falls below a threshold.

3. The system of claim 1, wherein the detector is configured to exclude photons whose energies are below a cutoff energy from the number.

4. The system of claim 1, wherein the controller is configured to stop electroplating by stopping applying an electric current through the electrolyte.

5. The system of claim 1, wherein the controller is configured to stop electroplating by removing a workpiece from the electrolyte.

6. The system of claim 3, wherein the cutoff energy is 2 keV.

7. The system of claim 1, wherein the detector is configured to determine the number based on charge carriers generated in the detector by the photons.

8. The system of claim 1, further comprising a radiation source configured to direct radiation toward the electrolyte; wherein the radiation causes emission of the one or more characteristic X-rays of the chemical element.

9. The system of claim 1, wherein the detector comprises a plurality of pixels.

10. The system of claim 1, wherein the detector further comprises:
    an X-ray absorption layer comprising an electric contact;
    a first voltage comparator configured to compare a voltage of the electric contact to a first threshold;
    a second voltage comparator configured to compare the voltage to a second threshold;
    a detector controller;
    a plurality of counters each associated with a bin and configured to register a number of X-ray photons absorbed by the X-ray absorption layer and whose energy is in that bin;
    wherein the detector controller is configured to start a time delay from a time at which the first voltage comparator determines that an absolute value of the voltage equals or exceeds an absolute value of the first threshold;
    wherein the detector controller is configured to determine whether an energy of an X-ray photon falls into the bin;
    wherein the detector controller is configured to cause the number registered by the counter associated with the bin to increase by one.

11. The system of claim 10, wherein the detector further comprises an integrator electrically connected to the electric contact, wherein the integrator is configured to collect charge carriers from the electric contact.

12. The system of claim 10, wherein the detector controller is configured to activate the second voltage comparator at a beginning or expiration of the time delay.

13. The system of claim 10, wherein the detector controller is configured to connect the electric contact to an electrical ground.

14. The system of claim 10, wherein the X-ray absorption layer comprises silicon, germanium, GaAs, CdTe, CdZnTe, or a combination thereof.

15. The system of claim 10, wherein the detector does not comprise a scintillator.

16. A method comprising:
    determining a number of photons of one or more characteristic X-rays emitted by a chemical element in an electrolyte within a period of time, while a workpiece is electroplated in the electrolyte;

determining a concentration of the chemical element in the electrolyte based on the number;

replenishing the chemical element in the electrolyte or stopping electroplating the workpiece in the electrolyte, based on the concentration.

17. The method of claim 16, wherein the chemical element is replenished or electroplating the workpiece is stopped when the concentration falls below a threshold.

18. The method of claim 16, further comprising illuminating the electrolyte with radiation.

19. The method of claim 16, wherein photons whose energies are below a cutoff energy are excluded from the number.

20. The method of claim 16, wherein stopping the electroplating is by stopping applying an electric current through the electrolyte.

21. The method of claim 16, wherein stopping the electroplating is by removing the workpiece from the electrolyte.

22. The method of claim 19, wherein the cutoff energy is 2 keV.

\* \* \* \* \*